RE 25640
July 31, 1962          W. BRAUN ETAL          3,047,565
          PROCESS FOR EXTRACTION OF MONOMERIC
              CAPROLACTAM FROM ITS POLYMER
                  Filed Nov. 18, 1959
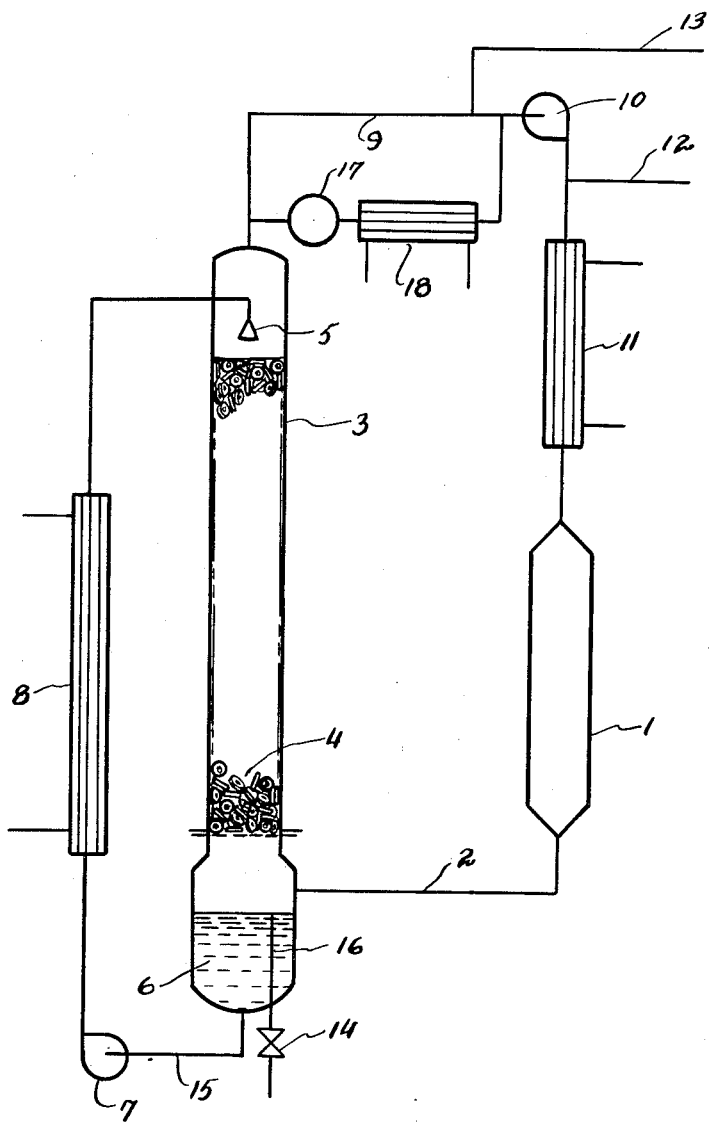
INVENTORS:
WILHELM BRAUN, WALTER ZEHNDER
BY Mestern & Kollin
ATTORNEYS

United States Patent Office 3,047,565
Patented July 31, 1962

3,047,565
PROCESS FOR EXTRACTION OF MONOMERIC CAPROLACTAM FROM ITS POLYMER
Wilhelm Braun, Lucerne, and Walter Zehnder, Ems, Switzerland, assignors to Inventa A.G. fur Forschung und Patentverwertung, Zurich, Switzerland
Filed Nov. 18, 1959, Ser. No. 853,814
Claims priority, application Switzerland Nov. 20, 1958
6 Claims. (Cl. 260—239.3)

The invention relates to a process for the production of lactams and, more particularly, to an increase in the quality of polycaprolactam by removal of low-molecular constituents therefrom.

Upon refining and fabrication of ε-caprolactam polymers, under certain conditions monomeric caprolactam is present which, for reasons of economics, should be re-used as starting material for the polymerization.

Crude ε-caprolactam polymers contain up to 12 percent low-molecular constituents consisting of monomeric, dimeric and trimeric caprolactam. In order to obtain a spinnable polycaprolactam, it is necessary to remove the monomer from the crude polymerizate completely, if possible. Such purification can be accomplished, e.g., by extraction of the comminuted material with water, vacuum evaporation of the low-boiling constituents from the melt or evaporation of the monomers from the solid polymer in vacuo or in an atmosphere of inert gas.

A suitable evaporation process has been described in Swiss Patent 265,206, wherein solid crude polymer is heated in the absence of oxygen and, if desired, in the presence of an inert gas to 130–200° C. whereby the monomeric lactam distills.

Another process step whereby monomeric lactam is recovered as by-product is the after-condensation of poly-ε-caprolactam at elevated temperatures (e.g., according to U.S. Patent 2,557,808 or Belgian Patent 551,476). In both instances, at the refining of the crude polymer and at the post-condensation, measures are taken to recover the monomeric lactam in pure and polymerizable form. When the polymer is treated in an inert gas atmosphere, a recovery and purification of the gas is provided in order to recycle the same. The process suited for that purpose consists in conducting the gas stream containing the low-molecular constituents through or over water or other solvents for lactam whereby the conditions easily can be chosen in such a manner that the lactam entrained in the gas stream is absorbed by the solvent practically in its entirety. Although this process is simple enough, it suffers from technological and economical drawbacks. For instance, on the one hand rather dilute lactam solutions are obtained whose concentration requires considerable energy. On the other hand, the inert gas, while being freed from lactam by the process, simultaneously is saturated with solvent in accordance with the latter's vapor pressure so that, before re-use as protective or rinsing gas in the evaporation or post-condensation, it must be subjected to a purification, i.e., an additional process step. Another disadvantage resides in the fact that vaporizable products which may be present in the polymer, e.g., plasticizers or lubricants, are obtained, during the treatment of the gas stream with solvents, in solid form and tend to clog the absorption system.

It now has been found that these drawbacks are averted when as an absorbing agent from a gas stream for the low-molecular constituents of the poly-ε-caprolactam, consisting mainly of monomeric caprolactam volatile at elevated temperatures, liquid lactam is employed instead of water or other lactam-solvents. Most advantageous is an absorption temperature of approximately 75° C. at which temperature the lactam vapor pressure is quite low, i.e., approximately 0.25 mm. Hg, so that a solidification of the lactam need not be considered. The evaporated lactam thereby is absorbed practically quantitatively, and the circulating inert gas can be re-used without purification since it is not contaminated by solvents and contains very little monomeric lactam due to the latter's low vapor pressure. However, if the polymer subjected to the evaporation process contains comparatively much water, the water content of the inert gas rises because at the absorption temperature of over 70° C. water has so high a vapor pressure that it is absorbed by the lactam only to a very slight extent. In that case it is advisable to dry at least part of the inert gas before recycling into the evaporator.

The monomeric caprolactam evaporated and absorbed in the liquid lactam in the manner described thereafter, naturally, assumes itself the function of an absorbent, i.e., it simply increases the quantity of lactam circulated and serving as absorbent. The excess lactam corresponding to the absorbed amount is drawn off and can directly be returned to the polymerization since it is pure and has a water content of less than 0.1 percent even when the original crude polymer evaporated had a water content up to 2 percent beside the low-molecular constituents.

The process according to the invention now will be further explained with reference to the accompanying drawing, a flow sheet, and thereafter in an example. However, it should be understood that both these are given merely by way of illustration, not of limitation, and that numerous changes may be made in the details without departing from the spirit and the scope of the invention as hereinafter claimed.

In evaporator 1, crude polymer containing low-molecular constituents and water is heated in a stream of inert gas. The latter is introduced through heater 11 and is conducted, together with evaporated monomeric lactam, by way of line 2, into absorption column 3. Column 3 is loaded with fillers to increase the contact surfaces. As absorbent and simultaneously as a coolant, liquid lactam is injected into column 3 through jet 5. This lactam, running downward over the fillers, is cooled by the counter-current stream of gas from which it absorbs monomeric lactam.

In sump 6 the entire lactam, i.e., that introduced through jet 5 and that absorbed from the gas, is collected and is reconducted to jet 5 by way of line 15, pump 7 and condenser 8. Simultaneously, continuously or in batches, the amount of lactam is drawn off from sump 6 through overflow pipe 16 provided with valve 14 which exceeds the constant quantity of lactam to be cycled. The lactam thus drawn off corresponds to the amount absorbed in the inert gas stream. The latter, substantially free of lactam, leaves column 3 through line 9 and is pumped by pump 10 through heater 11 and back into evaporator 1.

For rinsing of line 12, continuously a small amount of fresh gas is introduced, and a corresponding amount of circulating gas containing water and very little lactam is drawn off through line 13. This rinsing can be replaced, at least in part, in such a manner that at least part of the circulating gas before return into evaporator 1 after leaving the absorption column is pumped by pump 17 through the drying device 18 and there freed from water.

Example 1,000 kg. poly-ε-caprolactam shavings having an average size of 2.5 mm., a monomeric lactam content of 10.5 percent and a water content of 1.8 percent, are heated for 12 hours at 185° C. in evaporator 1. 250 m.³/h. nitrogen, preheated to 180° C. in heater 11, are blown through as circulating gas. The gas thereby loads itself with lactam and is conducted through line 2 into the absorption column 3. This vertical column has an inside diameter of 60 cm. and, within a length of 400 cm., contains Raschig rings 4 of 15 mm. diameter as filters.

7. m.³/h. lactam are injected through jet 5 over the fillers, this lactam serving as lactam absorbent and coolant simultaneously. The rising nitrogen, substantially freed from lactam and cooled in the column to 76° C., is recycled into the evaporator 1 by way of line 9, pump 10 and heater 11. The injected lactam, together with the monomer absorbed therein from the inert gas stream, is collected in sump 6 and is conducted, by means of pump 7, to the water condenser 8 where it is cooled to 75° C., and thence again to jet 5 where it again is injected. 88 kg. pure lactam are drawn off through overflow pipe 16 during evaporation and absorption. 15 m.³/h. fresh nitrogen are entered through line 12, and simultaneously an equal amount circulating gas is drawn off through line 13. From the evaporator, after termination of the evaporation, 907 kg. poly-ε-caprolactam having an extract content of 1.2 percent are removed.

We claim as our invention:

1. A process for the recovery of volatile monomeric caprolactam entrained in a stream of inert gas, which comprises bringing said gas stream in contact with liquid monomeric caprolactam which acts as solvent for said entrained caprolactam.

2. A process for the extraction of monomeric caprolactam from poly-ε-caprolactam by evaporation, which comprises exposing said poly-ε-caprolactam to an inert gas stream at a temperature of approximately 75° C. thus washing volatile monomer out of said poly-ε-caprolactam, and washing, said gas stream containing volatile monomer countercurrently with liquid monomeric caprolactam, thereby substantially freeing said gas stream from entrained monomeric caprolactam.

3. The process as claimed in claim 2, wherein said gas stream is circulated continuously.

4. The process as claimed in claim 3, wherein part of said circulated gas stream is withdrawn and replaced with fresh gas.

5. The process as claimed in claim 4, wherein said withdrawn gas is dried and again used as fresh gas.

6. A process for the extraction of monomeric caprolactam from poly-ε-caprolactam by evaporation, which comprises exposing said poly-ε-caprolactam to a stream of nitrogen gas at a temperature of approximately 75° C. thus washing volatile monomer out of said poly-ε-caprolactam, and washing said nitrogen stream containing volatile monomer countercurrently with liquid monomeric caprolactam, thereby substantially freeing said gas from entrained monomeric caprolactam.

References Cited in the file of this patent

UNITED STATES PATENTS

| 2,867,805 | Ludewig | Jan. 6, 1959 |
| 2,891,633 | Morro et al. | June 23, 1959 |

FOREIGN PATENTS

| 265,206 | Switzerland | Nov. 30, 1949 |